United States Patent Office 3,197,474
Patented July 27, 1965

3,197,474
ARYLAMINOALKYL HYDRAZINES AND ARALKYLAMINOALKYL HYDRAZINES
John H. Biel, Milwaukee, Wis., assignor, by mesne assignments, to Colgate-Palmolive Company, a corporation of Delaware
No Drawing. Filed Feb. 3, 1960, Ser. No. 6,380
18 Claims. (Cl. 260—296)

This invention relates to hydrazine derivatives. More particularly, this invention is concerned with arylaminoalkyl and aralkylaminoalkyl hydrazines and the use of these compounds as psychotherapeutic agents. The invention is also concerned with novel pharmaceutical compositions containing an arylaminoalkyl or aralkylaminoalkyl hydrazine.

This application is a continuation-in-part of my copending application, Serial No. 828,020, filed July 20, 1959, now abandoned, which in turn was a continuation-in-part of our application, Serial No. 679,520, filed August 21, 1957, now abandoned, my application Serial No. 726,356, filed April 4, 1958, now abandoned, and my application Serial No. 765,928, filed October 8, 1958, now abandoned.

It has now been discovered according to the present invention that arylaminoalkyl and aralkylaminoalkyl hydrazines of the formula

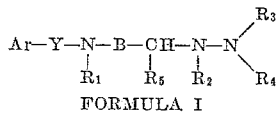

FORMULA I are potent monoamine oxidase inhibitors and central nervous system stimulents useful for psychotherapeutic treatment of depressed mental states, wherein Ar is an aryl group such as phenyl, a substituted phenyl group such as lower alkyl-phenyl groups like methylphenyl, halophenyl groups like chlorophenyl, lower alkoxy-phenyl groups like methoxyphenyl, lower alkylenedioxyphenyl groups like methylenedioxyphenyl, pyridyl, imidazolyl, thienyl and furyl, $R_1$ is hydrogen, an alkyl group and particularly a lower alkyl such as methyl, ethyl, propyl, butyl and the like, an alkenyl group such as allyl or the 1–(2-butenyl) group, an aralkyl group and particularly phenyl-lower alkyl groups such as benzyl and phenethyl, an aryl group and particularly the phenyl group, a cycloalkyl group and particularly the cyclopentyl or cyclohexyl group, and heterocylic-lower alkyl groups such as 3-pyridylmethyl, thenyl, 2-furfurylmethyl, 2-furylmethyl, and 2-imidazoylmethyl, $R_2$ is hydrogen or a lower alkyl such as methyl, ethyl, propyl or isopropyl, and $R_3$ and $R_4$ are the same or different groups of the group consisting of hydrogen alkyl group and particularly the lower alkyl groups including methyl, ethyl, propyl, butyl, pentyl and hexyl, acyl groups such as actyl, propionyl, butyryl, benzoyl, palmitoyl and phenylacetyl, hydroxy-alkyl groups such as hydroxymethyl, 2-hydroxyethyl and 3-hydroxypropyl, alkenyl groups and particularly lower alkenyl groups such as the allyl group and the 1–(2-butenyl) groups, aryl groups and particularly the phenyl group including nuclear substituted phenyl groups such as hydroxyphenyl, methoxyphenyl, chlorophenyl, acetoxyphenyl and the like, aralkyl groups and particularly phenyl-lower alkyl groups such as the benzyl, phenethyl, phenylpropyl and chlorophenylpropyl groups, cycloalkyl groups such as the cyclopentyl and cyclohexyl groups, alkynyl groups such as propynyl or butynyl, and groups in which

represents a cyclic secondary amino group such as the morpholino, pyrrolidino, piperidino, 1,2,3,4-tetrahydroisoquinolino, 1,2,3,4-tetrahydroquinolino, isoindolino, 4-ethyl-1-piperazino, hydroxypiperidino, indolino, theophyllino and phenothiazino groups, Y is a chemical bond or a straight or branched alkylene group of not more than five carbons, B is a straight or branched lower alkylene group, $R_5$ is hydrogen or a lower alkyl group and the group

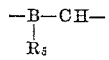

is advisably not more than five carbons.

Although I do not wish to be restricted to a theory, it is considered that these compounds pass through the blood-brain barrier and, because of their monoamine oxidase inhibitory property, retard or prevent the metabolic destruction of neurohumoral agents such as serotonin and norepinephrine. Serotonin and norepinephrine are present in the brain and apparently serve as chemical transmitters in, or stimulants of, the central nervous system. A deficiency of available serotonin or norepinephrine in the brain, such as can be caused by metabolism or degradation of these agents by monoamine oxidase, may result in parasympathetic predominance present in depressed mental states. By preventing or retarding destruction of serotonin and norepinephrine through the use of these hydrazines the levels of these neurohumoral agents present in the body are maintained higher for longer periods of time so that sympathetic characteristics such as increased awareness and motility result. These hydrazines also stimulate the heart musle and are thus useful for the treatment of a person in a state of shock. The compounds also form salts with penicillin and thus can be used to isolate and purify this antibiotic. These compounds are advisably employed in the described uses in the form of a nontoxic acid addition salt such as the hydrochloride, hydrobromide, fumarate or sulfate.

Some of the novel arylaminoalkyl and aralkylaminoalkyl hydrazines may be conveniently prepared by reacting an arylaminoalkyl or aralkylaminoalkyl halide with hydrazine or a monosubstituted hydrazine. This process may be represented as follows:

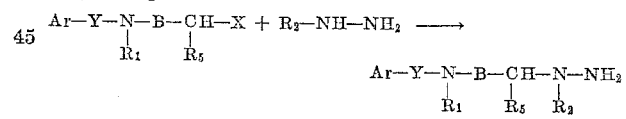

wherein Ar, $R_1$, $R_2$, Y, B and $R_5$ have the significance previously assigned and X is a reactive halogen such as bromine, chlorine, or iodine.

Some of the arylaminoalkyl and aralkylaminoalkyl halides which may be used in this process are N-phenylaminoethyl chloride, N-phenyl-N-methylaminoethyl chloride, N-phenyl-N-alkyaminoisoproyl bromide, N-2-pyridyl-N-methylaminoethyl chloride, N-3-pyridyl-N-methylaminoisopropyl chloride, N-2-thienyl-N-isopropylaminosec-butyl chloride, N - 2 - furyl - N - sec - butylaminoethyl chloride, N-2-imidazolyl-N-isopropylaminoethyl bromide, N-benzyl-N- methylaminoethyl chloride, N-benzyl-N-allylaminoisopropyl bromide, N - 2 - pyridylmethyl - N-methylaminoethyl chloride, N-3- pyridylmethyl-N-methylaminoethyl chloride, N - 4 - pyridylmethyl - N - methylaminoethyl chloride, N-2-thenyl-N - isopropylamino - sec-butyl chloride, N-2-furfurylmethyl - N - methylaminoisopropyl bromide, N-2-imidazolylmethyl-N-sec-butylaminoethyl chloride, phenylpropylaminoethyl chloride and N-phenylethyl-N-methyl-aminomethyl chloride.

In addition to hydrazine hydrate, monosubstituted hydrazines such as methylhydrazine, ethylhydrazine, isopropylhydrazine and butylhydrazine may be used in the process.

The reaction is effected by adding the arylaminoalkyl or aralkylaminoalkyl halide to a solution of a large excess, such as about 200%, of the hydrazine reactant in a solvent such as methanol, ethanol, butanol or dioxane. Increased temperatures such as up to reflux temperature are generally employed to increase the reaction rate. By distilling off the solvent, extracting the residue with a solvent such as ether and then fractionally distilling the extract, the desired reaction product may be recovered.

Some of the arylaminoalkyl and aralkylaminoalkyl hydrazines which may be produced in this way are N-phenylaminoethyl hydrazine, N-phenyl-N-methylaminoethyl hydrazine, N-phenyl-N-allylaminoisopropyl hydrazine, N-2-pyridyl-N-methylaminoethyl hydrazine, N-3-pyridyl-N-methylaminoisopropyl hydrazine, N-2-thienyl-N-isopropylamino-sec-butyl hydrazine, N-2-furyl-N-sec-butyl-aminoethyl hydrazine, N-2-imidazolyl-N-isopropylaminoethyl hydrazine, N-benzyl-N-methylaminoethyl hydrazine, N-o-chloro-benzyl-N-methylaminoisopropyl hydrazine, N-(1-phenyl-2-propyl)-aminoethyl hydrazine, N-(1-phenyl-2-propyl)-aminoisopropyl hydrazine, N-phenethylaminoisopropyl hydrazine, N-benzylaminoethyl hydrazine, N-2-thenyl-N-isopropylamino-sec-butyl hydrazine and N-2-furfurylmethyl-N-methylaminoisopropyl hydrazine.

Those compounds in which $R_3$ and $R_4$ are both substituents other than hydrogen, as well as compounds in which one or both of $R_3$ and $R_4$ are hydrogen, may be conveniently produced by reacting an arylaminoalkyl or aralkylaminoalkyl ketone or aldehyde with hydrazine or a substituted hydrazine to produce an intermediate arylaminoalkylidenyl or aralkyl-aminoalkylidenyl hydrazine, or hydrazone, which is then reduced to the corresponding hydrazine. This process may be represented as follows:

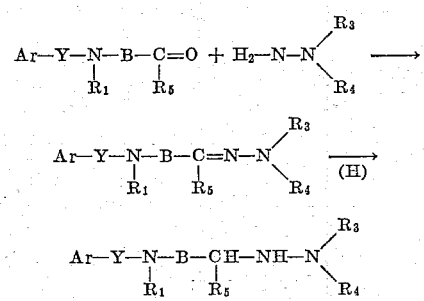

wherein Ar, Y, $R_1$, $R_3$ and $R_4$ have the significance previously assigned, B is a lower alkylene group and $R_5$ is hydrogen or a lower alkyl group.

Representatives of the arylaminoalkyl and aralkyl-aminoalkyl ketones and aldehydes which may be used in this process are N-phenyl-N-methylamino acetaldehyde, 2-(N-o-chlorophenyl-N-ethylamino)-propionaldehyde, alpha-(N-3-pyridyl-N-methyl-amino)-2-propanone, 2-thienyl-methylamino propionaldehyde, N-phenyl-N-ethyl-aminopropyl methyl ketone, 2-furylamino acetaldehyde, N-benzyl-N-methylamino acetaldehyde, 2-(N-o-chlorobenzyl-N-ethylamino)-propionaldehyde, alpha-(N-3-pyridylmethyl-N-methylamino)-2-propanone, alpha-(N-4-pyridylmethyl-N-methylamino)-2-butanone, 2-thienylmethylamino propionaldehyde, N-phenethyl-N-ethyl-aminopropyl methyl ketone, and 2-furylmethylamino acetaldehyde.

Representatives of the hydrazines which may be used in the process are hydrazine, acyl hydrazines such as acetyl hydrazine, propionyl hydrazine, benzoyl hydrazine, phenylacetyl hydrazine, isonicotinyl hydrazine, monosubstituted hydrazines such as methylhydrazine, ethylhydrazine and benzylhydrazine, phenethylhydrazine and N,N-disubstituted hydrazines such as N,N-dimethylhydrazine, N,N-diethylhydrazine, N,N-dibenzylhydrazine, N,N-diphenethylhydrazine, N-ethyl-N-benzyl hydrazine, N-amino-1,2,3,4-tetrahydroisoquinoline, N-amino-pyrrolidine, N-amino-tetrahydroisoindoline, N-amino-3-hydroxy-piperidine and N-amino-morpholine. The production of some of these hydrazines is shown in my copending application Serial No. 681,189, filed August 30, 1957.

Reaction between the ketone or aldehyde and the hydrazine is conveniently effected by contacting the reactants in the presence of water or a lower alcohol. The reaction proceeds at room temperature although slightly elevated temperatures may be employed to increase the rate of reaction. Recovery of the intermediate alkylidenyl hydrazine, or hydrazone, is conveniently effected by conventional methods. Thus, the product, generally an oil as the free base, may be salted out with an alkali metal hydroxide and extracted with a water immiscible organic solvent such as ether. The product is readily isolated by distillation under reduced pressure.

The intermediate hydrazone may be reduced to the corresponding hydrazine by use of a suitable reducing agent. Lithium aluminum hydride is the preferred reducing agent although catalytic hydrogenation also may be employed. With lithium aluminum hydride, the reduction may be conveniently effected by intimately combining the reactants in an inert organic solvent such as anhydrous ether, dioxane, or tetrahydrofuran. Elevated temperatures such as the reflux temperature enhance the reaction. At reflux temperature from 1 to 8 hours is usually sufficient to substantially complete the reaction. After the reaction is terminated, water may be added to the mixture to decompose excess lithium aluminum hydride. To recover the product the organic phase is separated and the aqueous residue extracted with the same solvent. The organic phase and extracts then may be combined, dried, and the product distilled.

Some of the hydrazines produced in this way besides those named previously having two carbons between the hydrazine and amine moieties are 1-(N-2-pyridyl-N-methylaminoethyl)-2-N',N'-dimethylhydrazine,
N-(phenylaminoethyl)-N-morpholino amine,
1-(N-2-thienyl-N-methyl-aminoethyl)-2-N'-methyl hydrazine,
N-(phenylaminoethyl)-N',N'-di-hydroxymethyl hydrazine,
1-(N-2-pyridylmethyl-N-methylaminoethyl)-2-N',N'-dimethylhydrazine,
1-(N-2-thienylmethyl-N-methyl-aminoethyl)-2-N'-methyl hydrazine,
N-(benzylaminoethyl)-N-morpholino amine,
N-(N-phenylisopropyl-N-ethyl aminoethyl)-N',N'-dibenzyl hydrazine,
N-(2-thenylaminopropyl)-N',N'-dipropyl hydrazine,
N-(2-pyridylethylaminoethyl)-N-pyrrolidino amine, and
N-(benzylaminoethyl)-N',N'-di-hydroxyethyl hydrazine.

The hydrazines in which $R_3$ and $R_4$ are substituents other than hydrogen may be converted to the compounds of Formula I in which $R_2$ is an alkyl or aralkyl group by the process of reductive alkylation employing a formaldehyde-formic acid mixture or an alkyl or aralkyl acyl halide, or equivalent ester, to form an intermediate acyl hydrazine and reducing the acyl group to an alkyl or alkylene group. This process may be represented as follows:

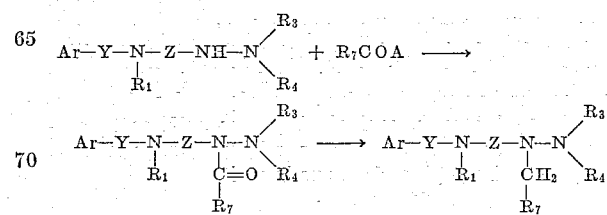

wherein Ar, $R_1$, Y, $R_3$ and $R_4$ have the significance previously assigned except that neither $R_3$ nor $R_4$ is hydrogen, A is a reactive halogen such as chlorine, bromine or iodine or a lower alkoxy group, and Z represents

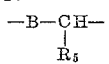

and R$_7$ is a lower alkyl, aryl (phenyl) or aralkyl (phenyl-lower alkyl) group.

In addition to the formaldehyde-formic acid mixture which can be used to introduce a methyl group for R$_2$ in Formula I, one may also use an alkyl formate to introduce the formyl group which then may be reduced as by platinum and hydrogen, or lithium aluminum hydride, to the methyl group.

Other esters or acyl halides may also be used to introduce the intermediate acyl group. Some such reactants which may be used are acetylchloride, propionylbromide, benzoylchloride, phenylacetylchloride, ethyl phenylacetate, phenylpropionylchloride, methylacetate and the like.

The acylation reaction is effected by contacting the reactants in an inert solvent such as ether or tetrahydrofuran and refluxing the mixture. Reduction of the intermediate acyl hydrazine is readily effected without isolation of the acyl compound by use of lithium aluminum hydride or catalytic hydrogenation. Some of the compounds produced in this way are N-(phenylaminoethyl)-N-methyl-N'-,N'-dimethyl hydrazine, N-(benzylaminoethyl)-N-methyl-N'-N'-dimethyl hydrazine, N-(phenethylaminopropyl)-N-phenethyl-N-morpholino amine and N - (N - benzyl-N-ethylaminoethyl)-N-ethyl-N',N'-di-hydroxyethyl hydrazine.

Acid addition salts of the novel hydrazines are produced by contacting the hydrazine with a mineral or organic acid. Acids such as hydrochloric, formic, maleic, fumaric and citric may be used to form salts of the hydrazines.

The hydrazines may be administered to animals and humans as pure compounds. It is advisable, however, to first combine one or more of the novel compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be used to form powders. The powders may be used as such for direct administration to a patient or, instead, the powders may be added to suitable foods and liquids, including water, to facilitate administration.

The powders also may be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets and capsules may contain any suitable predetermined amount of one or more of the hydrazines, advisably as a nontoxic acid addition salt, and may be administered one or more at a time at regular intervals. Such unit dosage forms, however, should generally contain a concentration of 0.1% to 10% by weight of one or more of the active hydrazines.

A typical tablet may have the composition:

|   | Mg. |
|---|---|
| (1) 2-(N-benzyl-N-methylamino) ethyl hydrazine | 10 |
| (2) Starch, U.S.P. | 57 |
| (3) Lactose, U.S.P. | 73 |
| (4) Talc, U.S.P. | 9 |
| (5) Stearic acid | 6 |

Powders 1, 2 and 3 are slugged, then granulated, mixed with 4 and 5, and tabletted.

Capsules may be prepared by filling No. 3 hard gelatin capsules with the following ingredients, thoroughly mixed:

|   | Mg. |
|---|---|
| (1) N - 3 - pyridylmethyl - N-methylamino-2-propyl hydrazine | 5 |
| (2) Lactose, U.S.P. | 200 |
| (3) Starch, U.S.P. | 16 |
| (4) Talc, U.S.P. | 8 |

The oral route is preferred for administering the active hydrazines.

According to a further embodiment of this invention one or more of the hydrazines is administered simultaneously with, or concomitantly to, the administration of either tryptophan and/or phenylalanine to an animal or human. Tryptophan passes the blood-brain barrier and is converted in the brain to serotonin. Serotonin is not administered directly since it cannot pass the blood-brain barrier. Similarly, phenylalanine passes the blood-brain barrier and is converted in the brain to norepinephrine. Norepinephrine itself will not pass the blood-brain barrier so it is not given directly. By the administration of an active hydrazine simultaneously with, or concomitantly to, either tryptophan or phenylalanine the monoamine oxidase inhibitory property of the hydrazine retards or prevents the degradation of serotonin and/or norepinephrine which are produced in the brain from the said amino acids. The serotonin and norepinephrine levels are thus not only raised but are maintained at the increased level by the described treatment.

Any suitable amounts of tryptophan and/or phenylalanine may be administered since these materials are nontoxic. One or both of these materials is advisably combined with one or more of the active hydrazines into suitable pharmaceutical formulations.

The following examples illustrate the methods of making the compounds.

EXAMPLE 1

2-(N-methyl-N-benzyl-amino)ethyl hydrazine

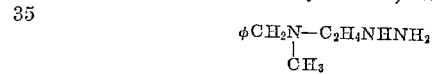

To 168 g. (2.85 mole) of 85% hydrazine hydrate in 200 cc. of boiling methanol was added 104.7 g. (0.475 mole) of N-benzyl-N-methylaminoethyl chloride hydrochloride in 250 cc. of methanol. The mixture was stirred and refluxed for 3 hours, the methanol removed by distillation and the residue taken up with water. The aqueous solution was made strongly alkaline with solid potassium hydroxide and extracted with ether. The ether extracts were dried with potassium carbonate and the product collected at 84–97° C. (0.2 mm.); yield 53 g. (62%), $N_D^{20}$ 1.5431.

Analysis.—Calcd. for $C_{10}H_{17}N_3$: N, 15.73%. Found: N, 15.27%.

The dihydrochloride salt melted at 184–187° C.

EXAMPLE 2

N-3-pyridylmethyl-N-methylamino-2-propyl hydrazine

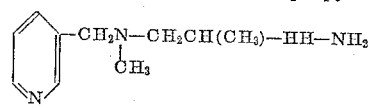

This compound was prepared from N-3-pyridylmethyl-N-methylamino-2-propyl bromide and an excess of hydrazine as described in Example 1; B.P. 120–122° C. (0.3 mm.).

EXAMPLE 3

2-(N-methyl-N-benzylamino)-ethylidenyl hydrazine 54.4 grams (0.2 M) of N-methyl-N-benzylamino acetal was hydrolyzed by adding it slowly with cooling to 275 g. of concentrated hydrochloric acid. The mixture was refrigerated overnight and then taken to dryness in vacuo. 50 cc. of water was added to the residue and then 20% NaOH added to pH 7. The product was dissolved in 100 cc. of methanol and added with stirring to 47 g. (0.8 M) of 85% hydrazine hydrate in 250 cc. of methanol. It was let stand overnight at room temperature, part of the solvent distilled off, and 400 cc. of water added. It was made strongly alkaline with KOH, extracted with a total of 400 cc. of ether and dried over anhydrous $K_2CO_3$. The ether was distilled off and the residue fractionated through a 3" column. Yield 27.3 g. (77%), B.P. 120° C./1.0 mm., $N_D^{20}$ 1.5522.

Analysis.—Calcd. for $C_{10}H_{15}N_3$: N, 7.90%. Found: N, 7.97%.

EXAMPLE 4

2-(N-methyl-N-benzylamino)ethyl hydrazine

In a 500 ml. flask was placed 5.3 g. (0.14 M) of $LiAlH_4$ in 200 ml. of dry ether. A solution of 25.5 g. (0.144 M) of 2-(N-methyl-N-benzylamino)ethylidenyl hydrazine in 100 cc. of dry ether was added over a 15 minute period. The reaction was exothermic. Stirring and refluxing of the reaction mixture continued for 4½ hours. An aqueous solution of 40% KOH was added to decompose the complex, the liquid decanted and the product rinsed with ether and dried over anhydrous $K_2CO_3$. The solvent was distilled off and the product fractionated through a 3" column. Yield 16.2 g. (63%), B.P. 101° C./0.05 mm., $N_D^{20}$ 1.543.

Analysis.—Calcd. for $C_{10}H_{17}N_3$: N, 15.73%. Found: N, 15.91%.

EXAMPLE 5

2-(N-mthyl-N-benzylamino)ethyl hydrazine dimaleate

A solution of 5.4 g. of the base in 30 ml. of ether was added to a solution of 8.1 g. of maleic acid in 75 ml. of ethanol. Yield 6.8 g., M.P. 124–125° C.

Analysis.—Calcd. for $C_{18}H_{25}N_3O_8$: Maleic acid, 56.42%; N, 6.81%. Found: Maleic acid, 57.91%; N, 6.83%.

EXAMPLE 6

N-2-(N'-o-chlorobenzyl-N'-methylamino)ethyl hydrazine 34 grams (0.125 M) of N-methyl N-o-chlorobenzylamino acetal was added to 65 cc. of concentrated hydrochloric acid at 5–10° C. The excess acid and water were distilled off under vacuum with a 50° C. water bath. The residue was diluted to 125 cc. volume with water and neutralized to pH 7 with 17 cc. of 10% sodium hydroxide. This solution was added to 36.7 g. (0.625 M) of 54.5% hydrazine at 5° C. and left standing overnight. The solution was saturated with sodium hydroxide with cooling, and the oil was extracted with three 75 cc. portions of ether. The extracts were dried over $K_2CO_3$ briefly and the solvent was distilled off through a 5" column. Residue weighed 25.15 g., 95.3%.

To 5.7 g. (0.15 M) of lithium aluminum hydride in 150 cc. tetrahydrofuran was added a solution of the hydrazone in 100 cc. of tetrahydrofuran in twenty minutes. The mixture was refluxed for three hours and the complex decomposed with 25 cc. of 40% KOH. The salts were filtered off and washed with tetrahydrofuran. The extracts were dried over $K_2CO_3$; the solvent distilled off through a 5" column and the residue vacuum distilled; B.P. 83–87° C. at 0.015 mm., wt. 7.45 g., $N_D^{25}$ 1.5394.

Analysis.—Calcd. for $C_{10}H_{16}N_3Cl$: N, 6.55%. Found: N, 6.39%.

EXAMPLE 7

N-2-(N'-o-chlorobenzyl-N'-methylamino)ethyl hydrazine dimaleate

To 7 g. (0.06 M) of maleic acid dissolved in 50 cc. ethanol was added a solution of 6.45 g. (0.03 M) of the base in 50 cc. of anhydrous ether. The solid was filtered off, washed with alcohol, dried and weighed, 6.75 g. or 50.3% yield, M.P. 121–122° C.

Analysis.—Calcd. for $C_{18}H_{24}N_3ClO_8$, N, 6.28%. Found: N, 6.33%.

Neutral equivalent: 111.46%. Found: 107.48%.

EXAMPLE 8

1-(N-benzyl-N-methylaminoethylidenyl)-N',N'-dimethylhydrazine

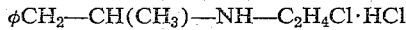

To 32.6 g. (0.20 mole) of N-benzyl-N-methylaminoacetaldehyde hydrochloride in 150 cc. of water was added 12.0 g. (0.20 mole) of N,N-dimethylhydrazine. The mixture was stirred at room temperature for 16 hours, made strongly alkaline with solid KOH and extracted with ether. The ether solution was used in the subsequent of Example 9.

EXAMPLE 9

1-(N-benzyl-N-methylaminoethyl)-N',N'-dimethylhydrazine

An ether solution of the ethylidene derivative from Example 8 was reduced with 7.6 g. (0.20 mole) of lithium aluminum hydride in the usual manner, B.P. 110–112° C. (0.50 mm.).

EXAMPLE 10

N-(1-phenyl-2-propyl)-aminoethyl chloride hydrochloride

In a 500 cc. 3-neck round bottom flask equipped with mantle, stirrer, condenser, and gas inlet tube, was placed 80 g. (0.45 M) of N-(1-phenyl-2-propyl)-aminoethanol dissolved in 180 cc. of chloroform. Anhydrous hydrochloric acid was bubbled into the solution until a pH of 2.0 was reached. Heating was begun and 119 g. (1.0 M) of thionyl chloride was added dropwise. The solution turned black. It was refluxed two hours after the thionyl chloride addition. The chloroform was removed in vacuo leaving 115 g. (0.45 M) of a brown oily residue.

EXAMPLE 11

N-(1-phenyl-2-propyl)-aminoethyl hydrazine $\phi CH_2CH(CH_3)-NH-C_2H_4NH-NH_2$ In a liter 3-neck round bottom flask equipped with mantle, stirrer, condenser and dropping funnel was placed 132.75 g. (2.25 M) of 85% hydrazine hydrate in 150 cc. methanol. The temperature was brought to reflux. To the refluxing solution was added, dropwise, 115 g. (0.45 M) of N-(1-phenyl-2-propyl)-aminoethyl chloride hydrochloride dissolved in 250 cc. of methanol. The solution was refluxed for 10 hours after the addition. It was concentrated in vacuo. The residue was dissolved in 250 cc. of water, made alkaline with KOH, and extracted 3 times with 100 cc. of ethyl ether. The ether extracts were dried over anhydrous potassium carbonate and concentrated on a steam bath. The residue, 52 g. (0.27 M), was distilled thru a 4" Vigreaux column yielding 27.5 g. boiling at 121–126° C. (0.4 mm.). The yield was 50%.

EXAMPLE 12

N-(1-phenyl-2-propyl)-aminoethyl hydrazine dihydrochloride

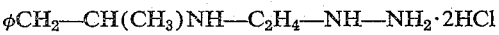

27.5 g. (0.13 M) of N-(1-phenyl-2-propyl)-aminoethyl hydrazine was dissolved in 300 cc. of ethyl ether. To this was slowly added, with mixing and cooling, 75 cc. of ethereal hydrochloric acid (4.18 N). A gummy precipitate was formed. It was cooled and the ether was then decanted cautiously. The gummy precipitate was crystallized in a 1:3 mixture of isopropyl alcohol and acetonitrile, filtered, washed, and dried in a desiccator; yield, 45 g., M.P. (shrinks at 135° C.), 140–160° C. The 45 g. was recrystallized in 200 cc. of hot ethanol yielding 20 g. of product. The percentage yield was 54%. M.P. (shrinks at 135° C.), 203° C.; foams 210–212° C.

Analysis.—Calcd. for $C_{11}H_{21}N_3Cl_2$: N, 15.79%; Cl, 26.64%. Found: N, 15.42%; Cl, 26.47%.

EXAMPLE 13

β-[N-methyl-N-(4-fluoro)-benzyl]-aminoethyl hydrazine

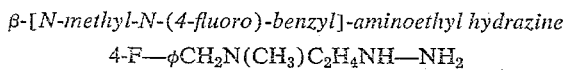

A solution of 47.6 g. (0.2 mole) of N-methyl-N-(4-fluoro)-benzylamino ethyl chloride hydrochloride in 250 cc. of ethanol was added over a period of 2 hours to a stirred refluxing solution of 70.4 g. (1.5 mole) of hydrazine hydrate 85% in 250 cc. of ethanol. After 2 more hours of reflux most of the alcohol was removed by distillation. After addition of potassium hydroxide solution the mixture was extracted with ether, dried over potassium carbonate, filtered and fractionated. There was obtained 27.6 g. (70%) of compound, B.P. 98° C./0.3 mm., $N_D^{20}$ 1.5194.

*Analysis.*—Calcd. for $C_{10}H_{16}FN_3$: N, 21.30%. Found: N, 20.94%.

DIHYDROCHLORIDE SALT

The dihydrochloride was prepared by adding ethereal hydrochloric acid to a solution of the base in ethanol. The salt was recrystallized from methanol, M.P. 191–192° C.

*Analysis.*—Calcd. for $C_{10}H_{18}Cl_2FN_3$: N, 15.55%; Cl, 26.25%. Found: N, 15.50%; Cl, 26.42%.

EXAMPLE 14

1-(N-methyl-N-benzylaminoethyl)-2-palmitoyl hydrazine

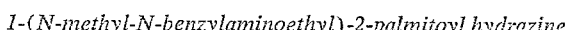
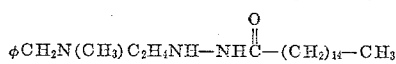

To a solution of 17.9 g. (0.1 mole) of N-methyl-N-benzylaminoethyl hydrazine and 25.6 g. (0.1 mole) of palmitic acid in 200 cc. of warm ethanol was added a solution of 22.6 g. (0.11 mole) of dicyclohexyl carbodiimide in 75 cc. of ethanol. The solution was refluxed for 12 hours, refrigerated and 15 g. of dicyclohexyl urea were filtered off. After concentrating to half its volume, the solution was refluxed another 12 hours resulting in the separation of a trace more of material. The solution was then taken to dryness and the 57.5 g. of residue were recrystallized from 400 cc. of boiling acetonitrile. After refrigeration and filtration there was isolated 32.5 g. of the hydrazide, M.P. 45–65° C. (unsharp).

DIHYDROCHLORIDE SALT 30 g. of the hydrazide was dissolved in 1200 cc. of dry ether and filtered to remove some insoluble material. After addition of ethereal hydrochloric acid there formed a gel-like precipitate which hardened on refrigeration. After standing for 48 hours in the refrigerator, the product was filtered and dried. Yield 24 g. (53%), shrinking at ca. 85° C. and becoming translucent at ca. 115° C.

*Analysis.*—Calcd. for $C_{26}H_{49}Cl_2N_3O$: N, 7.97%; Cl, 13.46%. Found: N, 8.11%; Cl, 13.65%.

EXAMPLE 15

2-(N-methyl-N-3',4'-methylenedioxybenzyl)-aminoethyl hydrazine

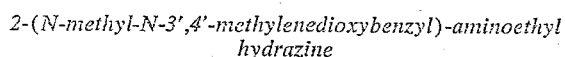
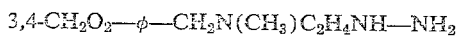

In a one liter three neck round bottom flask was placed 82.6 g. (1.4 mole) of 85% hydrazine hydrate and 150 mls. of 1/1 methanol/ethanol. The mixture was heated to reflux with stirring. Then a solution of 60.0 g. (0.22 mole) of 2-(N-methyl-N-3',4'-methylenedioxybenzyl) - aminoethyl chloride hydrochloride in a mixture of 150 mls. methanol, 150 mls. ethanol and 25 cc. water was added slowly, in 2 hours. When the addition was completed it was refluxed for an hour. The solvents were distilled off in vacuo, under nitrogen on a hot water bath, until the residue was very turbid. The residue was taken up in 250 mls. of water and, with cooling, made strongly alkaline with KOH. A yellow oil separated and was decanted off. The aqueous phase was extracted three times with 150 cc. of ether. The oil and extracts were combined and dried over anhydrous $K_2CO_3$. The ether was distilled off. The yield of crude residue was 38.4 g. It was fractionated in vacuo, under nitrogen, with a 3" column. B.P. 152–157° C./0.6 mm. Yield 23.2 g. (47.3%), $N_D^{20}$ 1.5487.

*Analysis.*—Calcd. for $C_{11}H_{17}N_3O_2$: N, 18.82%. Found: N, 17.42%.

DIHYDROCHLORIDE SALT 19.8 g. (0.89 mole) of the base was dissolved in a mixture of 300 cc. of anhydrous ether and 65 cc. of ethanol. With cooling and stirring it was acidified to pH 3.0 with ethereal HCl. The reaction was very exothermic. A precipitate formed and the mixture was chilled and the yellow solid filtered off, washed and dried. Yield of crude yellow solids 22.2 g., M.P. 159–170° C. It was recrystallized in 800 cc. of ethanol and 150 cc. of methanol to yield 12.8 g. (48.1%), M.P. 189–191° C.

*Analysis.*—Calcd. for $C_{11}H_{19}N_3O_2Cl_2$: N, 14.19%; Cl. 23.94%. Found: N, 14.15%; Cl, 23.92%.

EXAMPLE 16

2-(N-methyl-N-o-methylbenzyl)-aminoethyl hydrazine

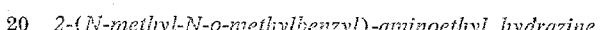
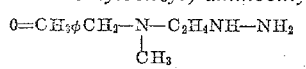

In a one liter three neck round bottom flask there was placed 53.7 g. (1.08 mole) of 85% hydrazine hydrate and 125 ml. of 1/1 methanol/ethanol. The mixture was heated to reflux with stirring and a solution of 42.8 g. (0.17 mole) of 2-(N-methyl-N-o-methylbenzyl)-aminoethyl chloride hydrochloride in 200 mls. of 1/1 methanol/ethanol added slowly in 2 hours. When the addition was completed the mixture was refluxed for an hour. The solvents were distilled off in vacuo, under nitrogen on a hot water bath until the residue was very turbid. The residue was taken up in 250 cc. of water and made strongly alkaline with KOH. A yellow oil separated and was decanted off. The aqueous phase was extracted three times with 150 cc. of ether. The oil and extracts were combined and dried over anhydrous $K_2CO_3$. The ether was distilled off in vacuo, under nitrogen. The crude residue weighed 32.4 g. It was fractionated, in vacuo, under nitrogen, with a 5" column. B.P. 93–94° C./0.15 mm. Yield 17.0 g. (51.7%), $N_D^{20}$ 1.5362.

*Analysis.*—Calcd. for $C_{11}H_{19}N_3$: N, 21.74%. Found: N, 20.02%.

DIHYDROCHLORIDE SALT 14.1 g. (0.07 mole) of the base was dissolved in 25 cc. of ethanol and 200 cc. of anhydrous ether. With cooling and stirring it was acidified with ethereal HCl to pH 3.0. It was chilled and the white solids filtered off, washed and dried. Yield of crude solids 18.6 g., M.P. 162–172° C. The product was recrystallized from a boiling mixture of 400 cc. of ethanol, 150 cc. of methanol, and 50 cc. of methyl nitrile. The yield of cream colored solids was 8.9 g. (41.8%), M.P. 182–185° C. (uncorr.).

*Analysis.*—Calcd. for $C_{11}H_{21}N_3Cl_2$: N, 15.79%; Cl, 26.64%. Found: N, 15.67%; Cl, 26.33%.

EXAMPLE 17

2-(N-methyl-N-p-methoxybenzyl)-aminoethyl hydrazine

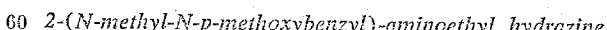
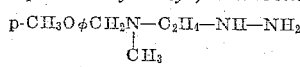

In a one liter three neck round bottom flask was placed 74.2 g. (1.26 mole) of 85% hydrazine hydrate and 100 mls. of 1/1 methanol/ethanol and the mixture then heated to reflux with stirring. There was then added dropwise to the refluxing solution, in 2 hours, a solution of 52.2 g. (0.209 mole) of 2-(N-methyl-N-p-methoxyphenyl)-aminoethyl chloride hydrochloride in 200 ml. of 1/1 methanol/ethanol. Refluxing was then continued for another hour. The alcohol and excess hydrazine were distilled off until the residue was very turbid. It was taken up in 300 mls. of water and made strongly alkaline with KOH and extracted four times with 100 mls. of ether.

The combined extracts were dried over anhydrous $K_2CO_3$ and the ether distilled off. Crude residue 41.1 g. It was distilled through a 5″ column under nitrogen. B.P. 140–145° C./1.2 mm. Yield, 27.8 g. (66.4%), $N_D^{20}$ 1.5397.

*Analysis.*—Calcd. for $C_{11}H_{19}N_3O$: N, 13.38%. Found: N, 13.02%.

DIHYDROCHLORIDE SALT 2.1 g. (0.01 mole) of the base was dissolved in 20 mls. of anhydrous ether and acidified with ethereal HCl to pH 3.0. A white precipitate formed. The mixture was chilled and then filtered, and the precipitate washed with anhydrous ether and dried. The yield of crude white product was 2.7 g., M.P. 169–190° C. It was recrystallized from 50 ml. of absolute ethanol and filtered and dried. Yield 1.7 g. (60.7%), M.P. 188–190° C.

*Analysis.*—Calcd. for $C_{11}H_{21}N_3OCl_2$: N, 4.96%; Cl, 25.13%. Found: N, 5.00%; Cl, 24.88%.

EXAMPLE 18

2-(N-methyl-N-m-methoxybenzyl)-aminoethyl hydrazine $m\text{-}CH_3O\phi CH_2N(CH_3)C_2H_4NH\text{---}NH_2$ In a one liter three neck round bottom flask was placed 98.4 g. (1.6 mole) of 85% hydrazine hydrate and 150 ml. of methanol and the mixture heated to reflux with stirring. A solution of 69.5 g. (0.27 mole) of 2-(N-methyl-N-m-methoxyphenyl)-aminoethyl chloride dihydrochloride in 150 ml. methanol was added dropwise to the refluxing solution in 3 hours. The mixture was refluxed for another hour. The alcohol and excess hydrazine were distilled off until very turbid and the residue was taken up in 300 ml. of water. It was made strongly alkaline with KOH and extracted four times with 200 ml. of ether. The combined extracts were dried over anhydrous $K_2CO_3$. The ether was distilled off to give a crude residue, 55.2 g. It was distilled through a 5″ column. B.P. 130–136° C./0.65 mm. Yield, 33.0 g. (58.4%).

*Analysis.*—Calcd. for $C_{11}H_{19}N_3O$: N, 13.38%. Found: N, 12.14%.

DIHYDROCHLORIDE SALT

A solution of 2.1 g. (0.01 mole) of the base in 20 ml. of anhydrous ether was acidified, slowly with cooling and stirring, with ethereal HCl. A white gummy precipitate formed, 10 ml. of absolute ethanol was added and solids crystallized with cooling. The precipitate was filtered, washed and dried. The yield of crude yellow solids was 2.5 g. (89.5%), M.P. 167–173° C. The product was recrystallized in 25 mls. of methanol. Yield, 1.58 g. (56%), M.P. 188–190° C. (uncorr.).

*Analysis.*—Calcd. for $C_{11}H_{21}N_3OCl_2$: N, 4.96%; Cl, 25.13%. Found: N, 5.04%; Cl, 24.95%.

EXAMPLE 19

2-(N-methyl-N-m-chlorobenzyl)-aminoethyl hydrazine $m\text{-}Cl\text{---}\phi CH_2N(CH_3)C_2H_4NH\text{---}NH_2$ N-(m-chlorobenzyl)-N-methylaminoethyl chloride (0.26 mole) was dissolved in 125 cc. of methanol and added to a refluxing solution of 84 g. (1.5 moles) of 85% hydrazine hydrate in 125 cc. methanol. The addition took 6 hours. It was refluxed 10 hours after the addition. Upon cooling a precipitate of hydrazine hydrochloride came out which was filtered. The filtrate was concentrated in vacuo and the residue of two layers was picked up in 150 cc. of water. The mixture was made strongly alkaline with KOH and extracted three times with 100 cc. of ether. The ether extracts were combined and dried over anhydrous $K_2CO_3$. The ether extract was concentrated on a steam bath and the residue distilled under nitrogen through a 5″ column. Yield, 25.5 g. (0.12 mole), 46% at 133–138° C./0.95–1.25 mm. $N_D^{20}$ 1.5442.

*Analysis.*—Calcd. for $C_{10}H_{16}N_3Cl$: N, 13.10%; Cl, 16.62%. Found: N, 12.44%; Cl, 16.85%.

DIHYDROCHLORIDE SALT

Twenty grams (0.09 mole) of N-(m-chlorobenzyl)-N-methylaminoethyl hydrazine was dissolved in 50 cc. of ethanol. 35 cc. of ethereal HCl (4.67 N) was added with cooling and scratching. A white precipitate formed which was filtered through a fritted funnel, washed with cold ethanol, and dried. Yield, 20.5 g. (0.087 mole) 96%; M.P. 193–195° C. (orange foam 203° C.). Upon standing the precipitate turned yellow. 14 g. was recrystallized in 150 cc. of boiling methanol. Yield, 7 g. (50%), M.P. 203–204° C., foams, dec., at 206° C.

*Analysis.*—Calcd. for $C_{10}H_{18}N_3Cl_3$: N, 14.66%; Cl, 37.11%. Found: N, 14.53%; Cl, 37.14%.

EXAMPLE 20

2-(N-methyl-N-p-chlorobenzyl)-aminoethyl hydrazine $p\text{-}Cl\phi CH_2N(CH_3)C_2H_4NH\text{---}NH_2$ In a one liter three neck round bottom flask was placed 61.4 g. (1.04 moles) of 85% hydrazine hydrate and 100 mls. of 50/50 ethanol/methanol. The mixture was heated to reflux with stirring. A solution of 44.2 g. (0.17 mole) of 2-(N-methyl-N-p-chlorophenyl)-aminoethyl chloride hydrochloride in 150 mls. of 50/50 ethanol/methanol was added dropwise to the refluxing solution in 2.5 hours. Refluxing was continued for another hour. The alcohol and excess hydrazine were distilled off until very turbid and the residue was taken up in 150 mls. of water. It was made strongly alkaline with KOH and a yellow oil separated. The oil was decanted off and the aqueous phase extracted four times with 100 mls. of ether. The oil and extracts (immiscible) were combined and dried over anhydrous $K_2CO_3$. (The oil became miscible with ether on drying.) The ether was distilled off to give a crude residue of 35.6 g. which was distilled through a 5″ column. B.P. 116–119° C./0.35 mm. Yield, 25.0 g. (69%), $N_D^{20}$ 1.5481.

*Analysis.*—Calcd. for $C_{10}H_{16}N_3Cl$: N, 13.10%; Cl, 16.59%. Found: N, 12.57%; Cl, 16.48%.

DIHYDROCHLORIDE SALT

A solution of 2.6 g. (0.01 mole) of the base in a mixture of 20 ml. of ether and 5 ml. of isopropanol was acidified slowly, with cooling and stirring, with ethereal HCl. A white precipitate formed which was filtered, washed and dried. The yield of crude solids was 2.9 g. (100%). M.P. 149–160° C. The product was recrystallized in 25 mls. of methanol. Yield, 1.85 g. (64.5%), M.P. 183–185° C. (uncorr.).

*Analysis.*—Calcd. for $C_{10}H_{18}N_3Cl$: N, 4.89% (1); ionic Cl, 24.74%; total Cl, 37.11%. Found: N, 5.01%; ionic Cl, 24.73%; total Cl, 37.05%.

EXAMPLE 21

2-(N-methyl-N-phenylamino)-ethylhydrazine

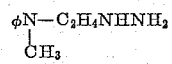

In a one liter three neck round bottom flask there was placed 77.8 g. (1.32 moles) of 85% hydrazine hydrate and 150 ml. of absolute ethanol. This mixture was heated to reflux and there was added dropwise with stirring in 3 hours, a solution of 44 g. (0.26 mole) of 2-(N-methyl-N-phenyl)-aminoethyl chloride in 200 ml. of methanol. When the addition was completed, the mixture was refluxed with stirring for 3 hours. The alcohol was distilled off. To the residue was added 100 cc. of water and the mixture was made strongly alkaline with KOH. A green oil separated and was decanted off. The aqueous phase was extracted three times with 100 cc. of ether. The oil and extracts were combined and dried over anhydrous $K_2CO_3$. The ether was distilled off. The crude residue weighed 42.1 g. It was distilled in vacuum under nitrogen with a 5″ column. The yield was 40.3 g. (97.9%), B.P. 105–109° C./0.2 mm., $N_D^{20}$ 1.5827.

*Analysis.*—Calcd. for $C_9H_{15}N_3$: N, 25.43%. Found: N, 24.70%.

EXAMPLE 22

*2-(N-methyl-N-phenylamino)ethyl hydrazine maleate*

To a solution of 2.3 g. (0.02 mole) of maleic acid in 10 ml. of absolute ethanol there was added a solution of 3.3 g. (0.02 mole) of the base in 5 ml. of absolute ethanol and 20 ml. of anhydrous ether. The reaction was exothermic. The mixture was cooled. The white solids were filtered off, washed with a 1/1 mixture of ethanol and anhydrous ether, and dried. The yield was 4.5 g. (80.4%), M.P. 90–91° C.

*Analysis.*—Calcd. for $C_{13}H_{19}N_3O_4$: N, 14.94%; maleic acid, 41.26%. Found: N, 15.08%; maleic acid, 42.55%.

EXAMPLE 23

*2-(N-methyl-N-phenylamino)-ethylidenyl hydrazine*

This compound is prepared by hydrolyzing N-methyl-N-phenylamino acetal and reacting with hydrazine hydrate as described in Example 2.

EXAMPLE 24

*2-(N-methyl-N-phenylamino)ethyl hydrazine*

This compound is prepared by reducing the product of Example 24, i.e., 2-(N-methyl-N-phenylamino)ethylidenyl hydrazine, with LiAlH₄, following the procedure of Example 4.

EXAMPLE 25

*N-2-(N'-o-chlorophenyl-N'-methyl-amino)-ethyl hydrazine*

Following the procedure of Example 6, this compound is prepared by hydrolyzing N-methyl-N-o-chlorobenzyl-amino acetal, followed by reduction with LiAlH₄.

Various changes and modifications of the invention can be made and, to the extent that such variations incorporate the spirit of this invention, they are intended to be included within the scope of the appended claims.

What is claimed is:

1. A member of the group consisting of compounds of the formula

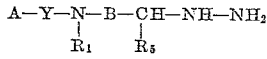

and nontoxic acid addition salts thereof wherein A is a member of the group consisting of phenyl, lower alkyl-phenyl, halophenyl, lower alkoxy-phenyl, lower alkylenedioxyphenyl and pyridyl, $R_1$ is a member of the group consisting of hydrogen and lower alkyl, $R_5$ is a member of the group consisting of hydrogen and lower alkyl, Y is a lower alkylene of not more than 5 carbons, and B is lower alkylene.

2. A member of the group consisting of compounds of the formula

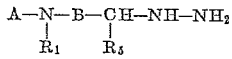

and nontoxic acid addition salts thereof wherein A is a member of the group consisting of phenyl, lower alkyl-phenyl, halophenyl, lower alkoxy-phenyl, lower alkylenedioxyphenyl and pyridyl, $R_1$ is a member of the group consisting of hydrogen and lower alkyl, $R_5$ is a member of the group consisting of hydrogen and lower alkyl and B is lower alkylene.

3. A member of the group consisting of compounds of the formula

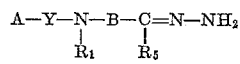

and nontoxic acid addition salts thereof wherein A is a member of the group consisting of phenyl, lower alkyl-phenyl, halophenyl, lower alkoxy-phenyl, lower alkylenedioxyphenyl and pyridyl, $R_1$ is a member of the group consisting of hydrogen and lower alkyl, $R_5$ is a member of the group consisting of hydrogen and lower alkyl, Y is a lower alkylene of not more than 5 carbons, and B is lower alkylene.

4. A member of the group consisting of compounds of the formula

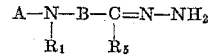

and nontoxic acid addition salts thereof wherein A is a member of the group consisting of phenyl, lower alkyl-phenyl, halophenyl, lower alkoxy-phenyl, lower alkylenedioxyphenyl and pyridyl, $R_1$ is a member of the group consisting of hydrogen and lower alkyl, $R_5$ is a member of the group consisting of hydrogen and lower alkyl and B is lower alkylene.

5. 2-(N-methyl-N-benzylamino)ethyl hydrazine.
6. N-3-pyridylmethyl-N-methylamino-2-propyl hydrazine.
7. β - [N - methyl - N - (4 - fluoro) - benzyl] - aminoethyl hydrazine.
8. 2-(N-methyl-N-3′,4′-methylenedioxybenzyl)-aminoethyl hydrazine.
9. 2-(N-methyl-N-o-methylbenzyl)aminoethyl hydrazine.
10. 2-(N-methyl-N-methoxybenzyl)aminoethyl hydrazine.
11. 2-(N-methyl-N-chlorobenzyl)-aminoethyl hydrazine.
12. N-(1-phenyl-2-propyl)-aminoethyl hydrazine.
13. 2-(N-methyl-N-phenylamino)ethyl hydrazine.
14. N-3-pyridyl-N-methylamino-2-propyl hydrazine.
15. 2-(N-methyl-N-3′,4′-methylenedioxyphenyl)-aminoethyl hydrazine.
16. 2-(N-methyl-N-o-methylphenyl)-aminoethyl hydrazine.
17. 2-(N-methyl-N-methoxyphenyl)-aminoethyl hydrazine.
18. 2-(N-methyl-N-chlorophenyl)-aminoethyl hydrazine.

References Cited by the Examiner

UNITED STATES PATENTS

| | | | |
|---|---|---|---|
| 2,420,702 | 5/47 | Drewitt | 260—569 |
| 2,695,297 | 11/54 | Hoffman et al. | 260—296 |
| 2,792,403 | 5/57 | Blicke | 260—296 |
| 2,804,422 | 8/57 | Schumann et al. | 167—65 |
| 2,830,050 | 4/58 | Biel | 260—583 |
| 2,838,441 | 6/58 | Allen et al. | 167—65 |
| 2,927,111 | 3/60 | Biel | 260—293 |
| 2,930,795 | 3/60 | Biel | 260—293 |
| 2,955,108 | 10/60 | Omietanski | 260—583 |
| 3,051,707 | 8/62 | Biel | 260—583 |

OTHER REFERENCES

Noller: "Chem. of Org. Compds.," 2nd ed., page 241 (1957).

Sidgewick: "Org. Chem. of Nitrogen," page 28, (1927).

Sommer et al.: Chem. Abstracts, vol. 19, p. 3250 (1946).

WALTER A. MODANCE, *Primary Examiner.*

DUVAL T. McCUTCHEN, *Examiner.*